(12) United States Patent
Prima et al.

(10) Patent No.: US 8,720,946 B2
(45) Date of Patent: May 13, 2014

(54) GAS GENERATOR WITH TWO PYROTECHNIC CHARGES

(75) Inventors: Gérald Prima, Landrevarzec (FR); Sébastien Kermarrec, Briec (FR); Maxime Lejeune, Gouezec (FR); Gildas Clech, Plougastel-Daoulas (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/642,032

(22) PCT Filed: Apr. 15, 2011

(86) PCT No.: PCT/EP2011/056048
§ 371 (c)(1),
(2), (4) Date: Oct. 18, 2012

(87) PCT Pub. No.: WO2011/131589
PCT Pub. Date: Oct. 27, 2011

(65) Prior Publication Data
US 2013/0036934 A1    Feb. 14, 2013

(30) Foreign Application Priority Data

Apr. 20, 2010  (FR) ...................................... 10 52995

(51) Int. Cl.
*B60R 21/26*    (2011.01)
(52) U.S. Cl.
USPC ............................ 280/741; 280/736; 102/530
(58) Field of Classification Search
USPC .................................. 280/736, 741; 102/530
See application file for complete search history.

(56) References Cited

U.S. PATENT DOCUMENTS 4,950,458 A    8/1990   Cunningham
5,564,743 A  * 10/1996  Marchant ...................... 280/741
(Continued)

FOREIGN PATENT DOCUMENTS

DE         20017851       3/2001
DE       102008060305     6/2010
(Continued)

OTHER PUBLICATIONS

International Search Report and Written Opinion for PCT/EP2011/056048, ISA/EP, Rijswijk, NL, mailed Jun. 29, 2011.

*Primary Examiner* — Paul N Dickson
*Assistant Examiner* — Timothy Wilhelm
(74) *Attorney, Agent, or Firm* — Harness, Dickey & Pierce, P.L.C.

(57) ABSTRACT

A gas generator has two pyrotechnic charges in two chambers having openings for gas outlet to the outside. Only the first chamber is provided with an igniter for first charge. The chambers are separated by a third wall with a through hole for permanent gas communication, sealed in an initial state by a cap. The cap is configured to be broken under the pressure of the combustion gases from first charge to keep the hole opened permanently and allow the combustion gases from the first charge to go via the hole kept permanently opened from a first chamber to a second chamber, where these gases induce the combustion of charge. When in an initial state, the cap is configured to go under the pressure of the combustion gases from second charge to the permanent state, in which the cap is broken to keep hole opened permanently and allow the combustion gases from said second charge to go via the hole kept permanently open from the second chamber to the first chamber, where this combustion gases induce the combustion of charge.

17 Claims, 4 Drawing Sheets

(56) References Cited

U.S. PATENT DOCUMENTS

| | | | |
|---|---|---|---|
| 5,628,528 A * | 5/1997 | DeSautelle et al. | 280/736 |
| 6,237,950 B1 * | 5/2001 | Cook et al. | 280/736 |
| 7,073,820 B2 | 7/2006 | McCormick | |
| 7,204,512 B2 * | 4/2007 | Patterson et al. | 280/736 |
| 7,641,231 B2 * | 1/2010 | Ti u | 280/736 |
| 7,654,565 B2 * | 2/2010 | McCormick et al. | 280/736 |
| 7,739,957 B2 * | 6/2010 | Patterson et al. | 102/531 |
| 7,950,691 B1 * | 5/2011 | Mayville | 280/736 |
| 7,988,192 B2 * | 8/2011 | Numoto et al. | 280/741 |
| 8,011,302 B2 * | 9/2011 | Abaziou | 102/530 |
| 2009/0115175 A1 | 5/2009 | Nishimura et al. | |
| 2009/0283006 A1 | 11/2009 | Abaziou | |
| 2011/0221176 A1 | 9/2011 | Bierwirth et al. | |

FOREIGN PATENT DOCUMENTS

| | | |
|---|---|---|
| EP | 0733519 | 9/1996 |
| EP | 0836563 | 10/2002 |
| EP | 1659036 | 5/2006 |
| EP | 1935726 | 6/2008 |
| FR | 2877428 | 3/2007 |
| FR | 2890022 | 3/2007 |

* cited by examiner

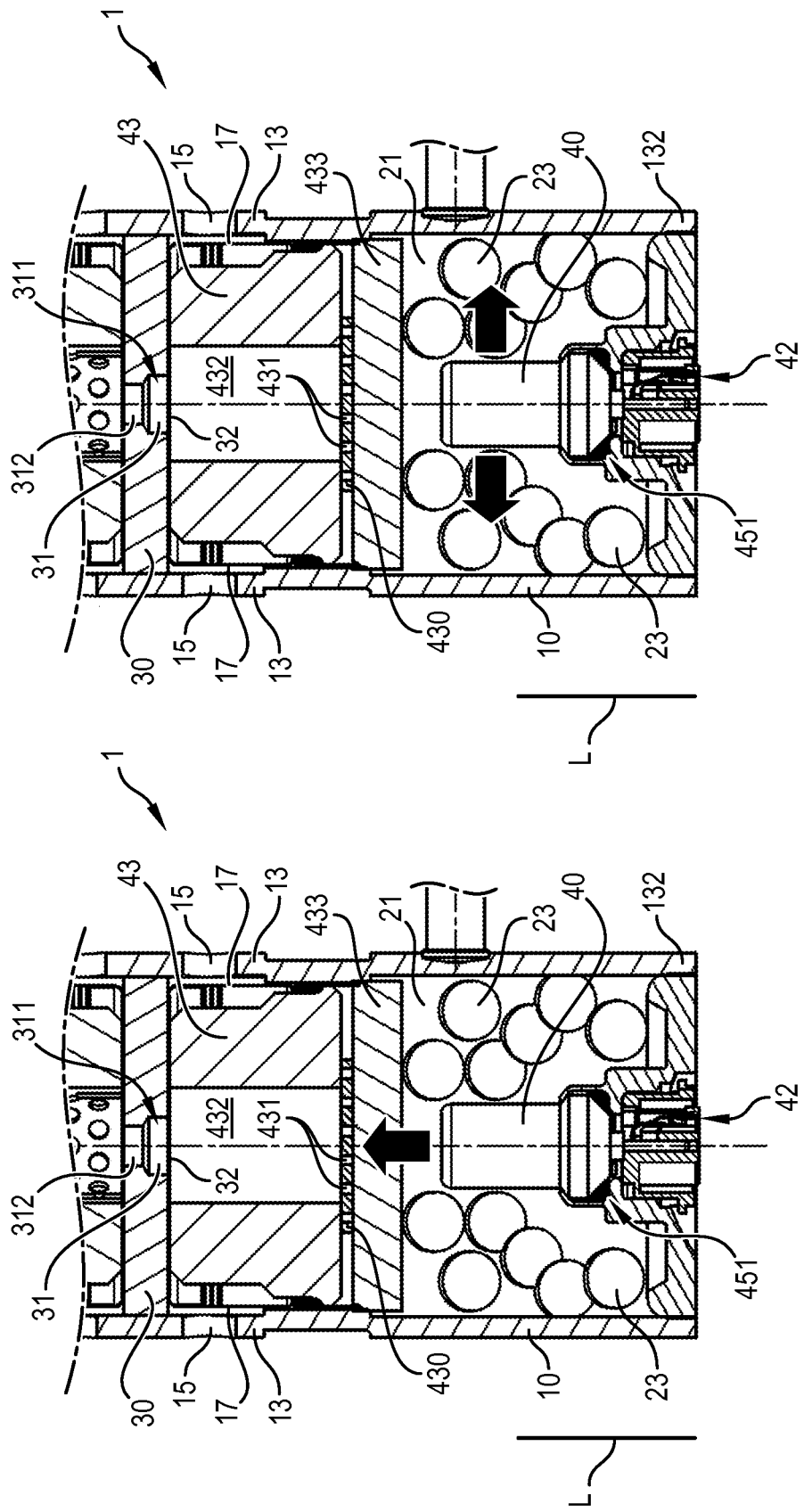

GAS GENERATOR WITH TWO PYROTECHNIC CHARGES

CROSS-REFERENCE TO RELATED APPLICATIONS

This application is a 371 U.S. National Stage of International Application No. PCT/EP2011/056048, filed Apr. 15, 2011 and published in English as WO2011/131589 A1 on Oct. 27, 2011, which claims priority to French Patent Application No. 1052995, filed Apr. 20, 2010. The disclosures of the above applications are incorporated herein by reference.

FIELD

The invention concerns a gas generator with two pyrotechnic charges.

BACKGROUND

Such gas generators are designed for automobile safety.

One of the applications of such a generator is for inflatable safety restraint systems, called airbags.

These generators serve to ignite the two pyrotechnic charges located in two different chambers from a single igniter located in one of the chambers.

Various devices of this type are known in the state of the art.

Thus, document FR-A-2 877 428 describes a generator comprising a tubular casing subdivided inside by two partitions that define three contiguous chambers, i.e., two combustion chambers each containing a pyrotechnic charge on either side of a pacification chamber communicating with a discharge opening provided in the casing. These partitions have an opening forming a duct that allows a controlled passage of the hot gas generated by combustion of the pyrotechnic charge from the combustion chambers to the pacification chamber, this gas then escapes the pacification chamber via the discharge opening to inflate an airbag. A single first combustion chamber is provided with a charge igniter, so that a part of the gas generated by the combustion of the charge of the first chamber passes through the pacification chamber and enters the second combustion chamber that does not have an igniter, where it induces the combustion of the charge present there, to go out through the discharge opening via the pacification chamber.

Document EP-B-836 563 describes a tubular generator with two chambers each containing propellant and separated from one another by a barrier preventing passage of the flame front generated by the initiator located in one of the chambers to directly induce the combustion of the propellant located in the other chamber. Instead of this, the heat generated by the combustion of the propellant of one chamber induces the delayed ignition of the propellant by convection and/or conduction forced through openings and a compartment surrounding both chambers.

Document U.S. Pat. No. 7,204,512 B2 describes a generator having a first chamber containing a first gas generator composition and a second chamber containing a second gas generator composition and a sympathetic initiation device for sympathetic ignition of the second composition in response to the combustion of the first composition. This sympathetic ignition device is in a partition separating the two chambers and includes a head and a shaft to communicate heat from the first chamber to the second chamber to ignite a self-initiation material located at the end of the shaft in the second chamber. This self-initiation material, with an ignition temperature less than that of the second composition, thus ignites this composition.

Document U.S. Pat. No. 7,073,820 B2 describes a generator in which igniting an initiator located in a first chamber induces the combustion of a first pyrotechnic charge located in this chamber, which generates combustion products that propagate through an opening initially closed by a cap to ignite a second gas generator composition located in a second cavity; the gas then escapes to the outside by openings made in this second cavity.

Document EP-A-733 519 describes a gas generator having two separate chambers, which each contain a gas generator material and an initiator for igniting the material to generate the gas and rapidly fill an airbag. The two chambers are separated by a wall provided with a cap, which is broken in response to a predetermined pressure level of the first of the chambers to allow the communication of fluids between the two chambers and which is supported by a support ring with a small-diameter central opening, so that, when the pyrotechnic gas generator material of the second chamber is ignited by the initiator found therein, the cap resists the increase in pressure of the second chamber, so that the gas pressure of the second chamber is confined therein and is not communicated to the first chamber.

Document U.S. Pat. No. 4,950,458 describes a gas generator according to the preamble of claim 1.

Today, many gas generators use pyrotechnic charges made up of pellets of propellant instead of blocks, for reasons of feasibility, the propellant manufacturing process, the density of the charge or the manufacturing cost of the propellant.

However, a first major disadvantage of pellets is that they have a shape function which is degressive, thus generating the maximum gas at the start of the operation, which can cause damage to the dashboard and its surroundings (breakage, deformation of the frame).

This disadvantage is especially important for pyrotechnic gas generators with a single igniter.

Moreover, a second requirement of current gas generators is that they must pass strict regulatory tests for safety, which require preventing fragmentation of the generator when the generator is subjected to an external heat source.

In order to verify this, the generators can be positioned on top of burners until their pyrotechnic charge(s) combust(s) by self-initiation of the pyrotechnic charge.

This characteristic is verified, for example, by a test required for regulations pertaining to transport of hazardous materials: the ONU6C test. Generators are positioned over a fire until they are triggered (by self-ignition of the pyrotechnic charge). The generators must be undamaged after triggering. The later the triggering occurs after the generator is heated or the fire is started, the more fragile the generator structure and the greater the risk of fragmentation.

A third requirement is also to improve the reproducibility of generator operation.

SUMMARY

The invention aims to obtain a gas generator with two pyrotechnic charges contained in two separate chambers that are ignited by an igniter located in one of the chambers, which simultaneously alleviates the above-mentioned disadvantage of the state of the art, resists fragmentation in accordance with the second requirement and improves the reproducibility of generator operation in accordance with the third requirement.

To this end, a first subject matter of the invention is a gas generator comprising at least first and second pyrotechnic charges located respectively in at least first and second chambers, the first chamber being partly delimited by a first outer wall comprising at least one opening for gas outlet to the outside, the second chamber being partly delimited by a second outer wall comprising at least one second opening for gas outlet to the outside separate from the first opening, only the first chamber being provided with an igniter suitable to be triggered to ignite the first pyrotechnic charge, the first chamber abutting the second chamber and being separated from the second chamber by a third wall, the first opening for gas outlet to the outside being closed by at least one first closing device that is suitable to be opened under the pressure of the combustion gases of the first pyrotechnic charge, the second opening for gas outlet to the outside being closed by at least one second closing device that is suitable to be opened under the pressure of the combustion gases of the second pyrotechnic charge, a third wall comprising at least one through-hole extending between the first chamber and the second chamber, the through-hole being sealed in a first initial state by at least one third cap, characterized in that the through-hole has as function to ensure permanent communication of gas between the first chamber and the second chamber in a second permanent state, the third cap being configured to be broken under the pressure of the combustion gases of the first charge so as, when the third cap is in a broken state corresponding to the second permanent state, to permanently keep open the through-hole of the third wall in said second permanent state and to let the combustion gases of the first pyrotechnic charge through said through-hole permanently open in said second permanent state from the first chamber to the second chamber, where these combustion gases induce the combustion of the second pyrotechnic charge, the second chamber having no igniter, the third cap, when it is in the first initial state where the third cap seals the through-hole, being configured to go, under pressure of the combustion gases of the second charge, to the second permanent state in which the third cap is broken, to permanently keep open the through-hole of the third wall in said second permanent state and to let the combustion gases of the second pyrotechnic charge through said through-hole permanently open in said second permanent state from the second chamber to the first chamber, so that these combustion gases induce the combustion of the first pyrotechnic charge.

The invention thus allows obtaining a low gas flow at the start of the generator, which becomes greater once the airbag has started to leave the module.

The invention permits obtaining this gas flow rate, for example, with charges made up of pellets having a shape function which is degressive. This allows obtaining a gas generator having, for example, pyrotechnic charges with a mass greater than or equal to 50 grams, which do not damage the module and its surroundings, and can be used to inflate a passenger airbag in an automobile.

According to the invention, the triggering of the second chamber during the fire test leads to igniting the first chamber. This reduces the time necessary for the combustion of all the pyrotechnic material.

This is not true for the other known generators discussed above, especially documents U.S. Pat. No. 7,073,820 B2 band EP-A-733 519, which provide a ball for closing the through-hole of the third separation wall for U.S. Pat. No. 7,073,820 B2 and a support ring for document EP-A-733 519, which in both cases stop the communication of gas from the second chamber to the first chamber. If there is a long time between the ignition of the two chambers, the structure becomes fragile and the fire test is harder to pass. Thus, in the case of the regulatory fire test of the generator according to the invention, the ignition of one of the chambers generates the ignition of the other chamber. Consequently, the casing of the generator according to the invention does not become fragile by additional overheating of the chamber, which has not been ignited by the fire.

According to one embodiment of the invention, between the igniter and the third cap is at least one fourth rigid separation wall comprising first gas-passage openings.

According to one embodiment of the invention, between the first sealing device and the first pyrotechnic charge is a first gas filter.

According to one embodiment of the invention, between the first pyrotechnic charge and the third cap is at least one fourth rigid separation wall comprising first gas-passage openings.

According to one embodiment of the invention, between the first closing device and the first pyrotechnic charge is a first gas filter surrounding a first gas passage, which extends between the third cap and at least one fourth rigid separation wall comprising first gas passage openings located facing said first passage, the first pyrotechnic charge being outside the first passage.

According to one embodiment of the invention, between the second closing device and the second pyrotechnic charge is a second gas filter.

According to one embodiment of the invention, the second gas filter surrounds a second gas passage, which extends at least to face through-hole, the through-hole being connected, when third cap is broken, to the inside of a gas guiding device, which is located in the second passage and which extends into second chamber up to a point located in second chamber at a distance from second filter, the gas guiding device comprising second gas passage openings between its inside and its outside in which is the second pyrotechnic charge, the second pyrotechnic charge being outside the second passage.

According to one embodiment of the invention, the gas guiding device is tubular.

According to one embodiment of the invention, the first and/or second gas passage extends along a longitudinal direction going from first chamber to second chamber.

According to one embodiment of the invention, the first pyrotechnic charge has a first mass M1, the second pyrotechnic charge has a second mass M2 and the distribution of mass between the first and second pyrotechnic charges M1/M2 is greater than or equal to $\frac{1}{4}$ and less than or equal to 3.

According to one embodiment of the invention, the first pyrotechnic charge has a first mass M1, the second pyrotechnic charge has a second mass M2 and the distribution of mass between the first and second pyrotechnic charges M1/M2 is less than or equal to 1.

According to one embodiment of the invention, the generator has means arranged to allow igniting first pyrotechnic charge before second pyrotechnic charge triggering igniter.

According to one embodiment of the invention, the generator has means arranged to allow opening first closing device before second closing device by triggering igniter.

According to one embodiment of the invention, the generator has means arranged to allow opening first closing device before third closing device by triggering igniter.

Or, according to one embodiment of the invention, the generator has means arranged to allow opening third closing device before first closing device by triggering igniter.

According to one embodiment of the invention, the generator has means arranged to allow opening third closing device before second closing device by triggering igniter.

According to one embodiment of the invention, the first closing device is formed by a first cap sealing first opening for gas outlet to the outside and suitable to be broken under said combustion gases pressure of first pyrotechnic charge, the second sealing device is formed by a second cap sealing the second opening for gas outlet to the outside and suitable to be broken under said combustion gases pressure of said second pyrotechnic charge, the first cap and the third cap and/or the second cap and the third cap being made in one and the same piece.

The invention will be better understood upon reading the description that follows, given solely by way of non-limiting example in reference to the attached drawing, in which:

BRIEF DESCRIPTION OF THE DRAWINGS

FIG. 3 is a partial view of FIG. 1, with an igniter of axial type, FIG. 4 is a partial view of FIG. 1, with an igniter of radial type.

DETAILED DESCRIPTION

Figure 1:
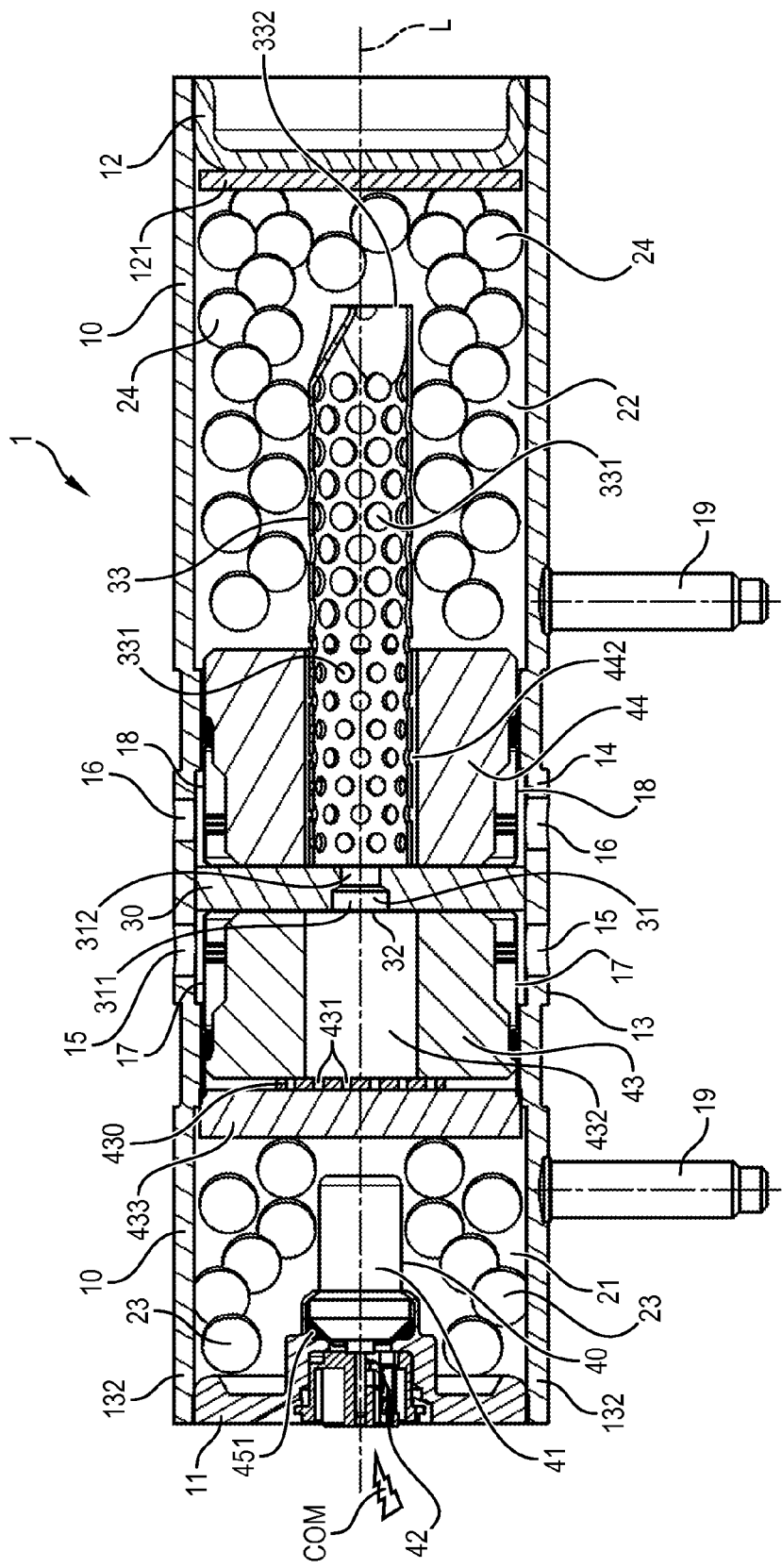
FIG. 1 is a schematic sectional view of a gas generator according to the invention according to a first embodiment.

In the embodiments shown in FIGS. 1 to 4, gas generator 1 according to the invention is generally tube shaped along a longitudinal direction L having an outer wall 10 that is closed at its first and second longitudinal ends 11, 12. Wall 10 is tubular, for example of cylindrical cross section, particularly circular. In the example of embodiment of FIG. 1, wall 10 is, for example, longer along longitudinal direction L than transversely to this longitudinal direction L. Wall 10 has one or more studs 19 for attachment at the outside of chambers 21 and 22.

Figure 2:
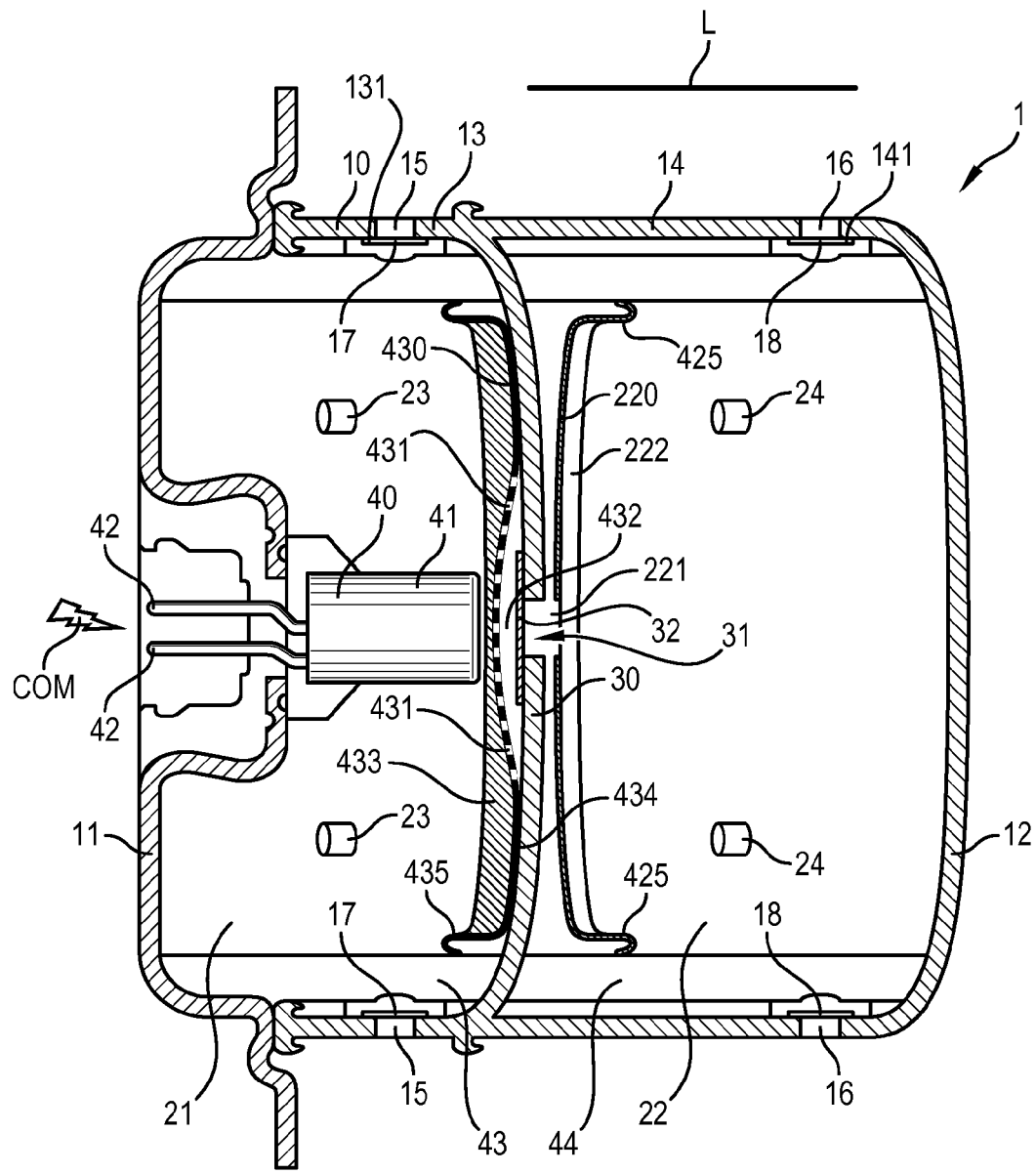
FIG. 2 is a schematic sectional view of a gas generator according to the invention according to a second embodiment.

In the example of embodiment of FIG. 2, wall 10 is, for example, shorter along longitudinal direction L than transversely to this longitudinal direction L, and therefore is generally disk shaped.

In the following, the description applies to FIGS. 1 to 5.

The interior of wall 10 has an inner wall 30 separating a first pyrotechnic chamber 21 from a second pyrotechnic chamber 22. First chamber 21 has a first outer wall 13 in which are one or more first openings 15 for gas outlet to the outside. Second chamber 22 has a second outer wall 14 in which are one or more openings 16 for gas outlet to the outside. The first and second walls 13, 14 are, for example, in line with one another and form, for example, outer wall 10. Ends 11 and 12 of chambers 21, 22 are those furthest from wall 30. For example, third wall 30 is assembled by crimping, welding or setting into wall 10, 13, 14.

Inside first chamber 21 delimited by first wall 13 is a first pyrotechnic charge 23, formed, for example, by pellets having a degressive shape function. Inside second chamber 22 delimited by second wall 14 is a second pyrotechnic charge 24, formed, for example, by pellets having a degressive shape function. No relay charge, for example, is provided to facilitate the ignition of second pyrotechnic charge 24. For example, a single type of pyrotechnic material is provided as second pyrotechnic charge 24.

Only one of chambers 21 and 22, i.e., first chamber 21, has an ignition device 40 for igniting its pyrotechnic charge 23 from the outside. This ignition device 40, or igniter 40, is, for example, formed by an electro-pyrotechnic initiator, such as known to those skilled in the art. End 11 of first chamber 21 is, for example, formed by an insert 45 set into end 132 of wall 13 far from wall 30, this insert 45 being of one piece with a part 451 for holding igniter 40 in position in first chamber 21. Such an electro-pyrotechnic initiator 40 comprises pins 42 accessible from the outside of first chamber 21, and going beyond insert 45, for example, toward the outside of the generator, to ignite a third pyrotechnic charge contained in its case 41. The combustion of this third charge contained in case 41 then induces the combustion of first pyrotechnic charge 23 in first chamber 21. A single igniter 40 is provided, for example, in first chamber 21, second chamber 22 not having an igniter.

According to the invention, third wall 30 separating first chamber 21 from second chamber 22 has at least one through-hole 31 connecting first chamber 21 with second chamber 22 and extending between the two chambers 21, 22. Third wall 30 is, for example, of a single piece between the two chambers 21 and 22. A first closing device 17 or first caps 17 are provided to seal first openings 15 by being located, for example, on inner surface 131 of first wall 13 as shown in FIG. 2.

A second closing device 18 or second caps 18 are provided to seal second openings 16 by being located, for example, on inner surface 141 of second wall 14 as shown in FIG. 2.

A third closing device 32 or at least one third cap 32 is provided to seal third opening 31 in a first initial state. Third cap 32 is located, for example, against third wall 30 by being located, for example, on the side of first chamber 21.

Through-hole 31 works to ensure permanent communication of gas between first chamber 21 and second chamber 22 in a second permanent state, different from the first initial state.

Third cap 32 is configured to be broken under the pressure of the combustion gases from first charge 23.

Thus, when third cap 32 is in a broken state corresponding to the second permanent state, through-hole 31 of third wall 30 is now permanently open in said second permanent opening state and the combustion gases from first pyrotechnic charge 23 go through said through-hole 31 now permanently open in said second permanent state from first chamber 21 to second chamber 22, where this combustion gases induce the combustion of second pyrotechnic charge 24. The pressure wave produced by igniter 40 does not break third cap 32 and as a result element 430, but it is the combustion of first charge 23 that induces the opening of third cap 32. Thus the generator's operation is reproducible.

According to the final design chosen, caps 17 and 32 and/or 18 and 32 can be made of a single piece.

A first gas condenser or gas filter 43 is provided in the first chamber between first charge 23 and first openings 15 and caps 17. A second gas condenser or gas filter 44 is provided in second chamber 22 between second charge 24 and second openings 16 and caps 18.

In second chamber 22, hole 31 is, for example, extended by a device 33 for gas guiding entering from hole 31 to the inside of chamber 22 along longitudinal direction L, this gas guiding device 33 being, for example, a grid formed by a perforated tube. This gas guiding device 33 thus crosses second condenser 44. The gas generator according to the invention functions as follows during normal triggering by command of igniter 40 to use the generator to release gas into a device having to receive this gas thus generated, for example to inflate an airbag in an automobile.

When an external command electrical signal, shown by the symbol COM in FIG. 1, is sent to igniter 40, igniter 40 is triggered, which induces the combustion of the third pyrotechnic charge contained in case 41, which thus ignites first charge 23 during a first phase.

The combustion gas pressure from first pyrotechnic charge 23 thus rises in chamber 21 and breaks first caps 17 as well as third cap 32 to bring the through-hole 31 from the first initial state sealed by third cap 32 to the second permanently open state of through-hole 31. Caps 17 and 32 are configured so that first cap 17 is open before third cap 32. Consequently, in the second permanent state, the communication is permanent between first chamber 21 and second chamber 22 through through-hole 31.

The flow of the combustion gas from first 21 is filtered by condenser 43, before beginning to flow via first openings 15 to the outside of generator 1, and the combustion gas flow from first pyrotechnic charge 23 of first chamber 21 enters into second chamber 22 permanently via third through-hole 31 now permanently open in the second state.

The increase in pressure in second chamber 22 combined with gas and hot particles from first chamber 21 inflames second charge 24 (ignition by influence) during a second phase.

The combustion of second charge 24 causes the pressure to rise in second chamber 22 and breaks second caps 18 of second outer openings 16.

The flow of gas coming from second chamber 22 is filtered by second condenser 44 before being evacuated to the outside of generator 1.

Pyrotechnic charges 23 and 24 continue to burn in chambers 21 and 22, respectively, thus generating a gas flow that escapes to the outside of generator 1 via openings 15 and 16.

Consequently, the cross section of the gas flow to the outside of generator 1 varies during its operation.

Indeed, during the first phase, the combustion gases from first charge 23 leave first chamber 21 only by first openings 15.

During the second phase, the combustion gases of first charge 23 and second charge 24 leave via first openings 15 and second openings 16.

The cross section for gas flow to the outside of the generator is thus greater in the second phase than in the first phase.

The mechanical strength and/or the thickness of third cap 32 and/or the section for gas flow or the diameter of through-hole 31 allow controlling the pressure for uncapping third cap 32 initially closing this hole 31, and also regulating the time until ignition of second pyrotechnic charge 24, as well as the flow rate of the combustion gases from first pyrotechnic charge 23 of first chamber 21 to second chamber 22.

Second caps 18 allow controlling the pressure in second chamber 22, ensuring complete ignition of second charge 24 before diffusing the combustion gases from second charge 24 to the outside of generator 1.

Figure 5:
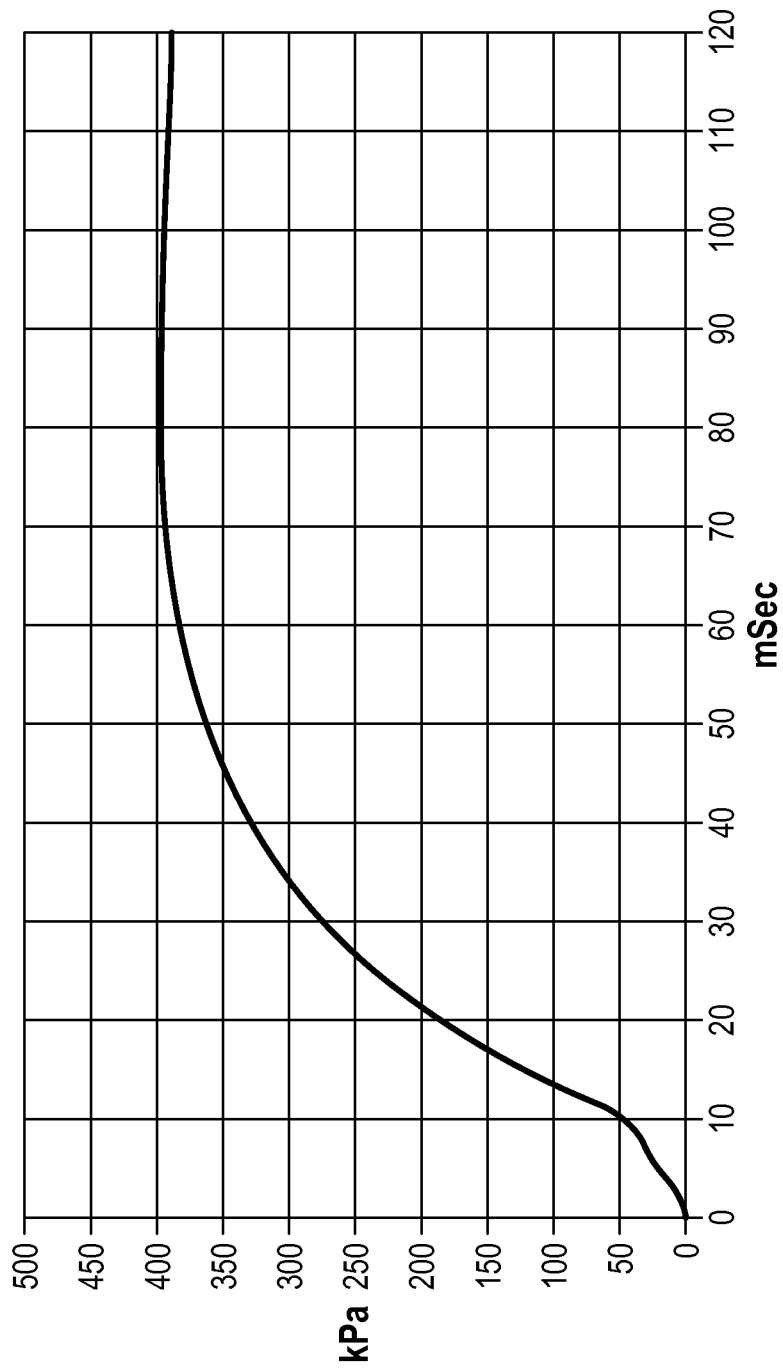
FIG. 5 is a curve showing the pressure generated in a measurement chamber by a gas generator according to the invention, this pressure being expressed on the y axis in kPa as a function of time expressed in milliseconds on the x axis, time 0 corresponding to the time the igniter is triggered.

As can be seen in FIG. 5, the invention thus allows igniting the first pyrotechnic chamber, which will generate a small gas flow at start up during the first phase and igniting second pyrotechnic charge 24 of second chamber 22 with a time delay during the second phase, the combustion of this second pyrotechnic charge 24 allowing the airbag to deploy properly without damaging the dashboard.

The invention allows substantial flexibility in the distribution of the pyrotechnic charges in the chambers. Indeed, second chamber 22 can contain the majority by mass of the total pyrotechnic charge of the generator while being ignited by a smaller mass of pyrotechnic charge 23 of first chamber 21. First pyrotechnic charge 23 can be identical to or different from second pyrotechnic charge 24. In the embodiment shown, second charges 23 and 24 are in the form of propellant pellets by pellets having a degressive shape function.

For example, for a total mass M of pyrotechnic charge in the generator (sum of mass M1 of first pyrotechnic charge 23 and mass M2 of second pyrotechnic charge 24), the distribution by weight of mass M1 of first pyrotechnic charge 23/mass M2 of second pyrotechnic charge 24 can range, for example, from 25/75 to 75/25.

In one example of embodiment, this distribution is, for example, 30% for M1 and 70% for M2.

Consequently, the invention allows igniting a majority of the pyrotechnic charge in the second chamber from the combustion of a minority of the pyrotechnic charge in the first chamber, which prevents the gas from starting to flow too aggressively to the outside of the generator during the first phase.

The invention allows dividing the pyrotechnic charge in two chambers 21, 22 sealed off from one another and uncapping sealing device 32 so as to ignite this compartment 22 in a delayed manner by influence, as is described above.

The total pyrotechnic mass M of charges 23 and 24, equal to M1+M2 is, for example, greater than or equal to 50 grams.

In the second phase, through-hole 31 allows connecting the two chambers 21 and 22 together to permit permanent gas passage between them.

Consequently, the arrangement of third wall 30 and through-hole 31, and notably the cross section of this through-hole 31, are one of the parameters allowing controlling the curve of the gas flow to the outside over time, and notably the coordinates of the inflection point of the flow curve of FIG. 5.

Through-hole 31 and cap 32 form means arranged to open first sealing device 17 before second sealing device 18 and for igniting first pyrotechnic charge 23 before second pyrotechnic charge 24, assuring good reproducibility of the generator operation.

Thus the ignition delay between the two chambers can be adjusted as needed, by adjusting the diameter of duct 31 and/or the thickness of cap 32.

The generator allows controlling the time delay between the ignition of the first pyrotechnic charge of the first chamber and ignition of the second pyrotechnic charge of the second chamber.

According to one characteristic of the invention, third cap 32, when it is in the first initial state where third cap 32 seals through-hole 31, is configured to go, under pressure of the combustion gases from second charge 24, to the second permanent state in which third cap 32 is broken, to permanently keep open through-hole 31 of third wall 30 in said permanent second state and to pass the combustion gases from second pyrotechnic charge 24 by said through-hole 31 now permanently open in said second permanent state from second chamber 22 to first chamber 21, so that these combustion gases induce the combustion of first pyrotechnic charge 23. Due to the increase in pressure of the combustion gases from second charge 24, second cap 18 and third cap 32 are broken so that the combustion gases escape by openings 16 to the outside of generator 1 and communicate with first chamber 21. The pressure increase of the combustion gases from first charge 23 also breaks first cap 17 after third cap 32, so that the combustion gases escape via openings 15 to the outside of generator 1.

By means of this feature, in the case where, due to a heat source outside the generator (the second chamber not containing igniter), the second pyrotechnic charge 24 of second chamber 22 is ignited, third cap 32 is broken quickly under the pressure of the gases of second chamber 22 so that these combustion gases quickly and reliably ignite first pyrotechnic charge 23, since through-hole 31 is now maintained permanently open in the second state and the communication of gas between the two chambers is permanent by through-hole 31 in this second state, preventing the danger of fragmentation of wall 10, 12, 13 or 14 of the chambers.

Thus, second pyrotechnic charge 24 of second chamber 22 is able, if it is self-ignited, to induce the ignition of first pyrotechnic charge 23 of first chamber 21. Moreover, first pyrotechnic charge 23 is able to ignite second pyrotechnic charge 24 following the self-ignition of first pyrotechnic charge 23 or during normal operation. These self-ignitions are verified, for example, during deliberate heating of the generator, for example during a ONU6C fire test.

Thus, a reproducible delay in ignition between the two pyrotechnic charges 23 and 24 is obtained with a robustness to meet the specifications despite the manufacturing and assembly tolerances of the components used.

According to one embodiment of the invention, between first closing device 17 and first pyrotechnic charge 23 is a first gas filter 43.

According to one embodiment of the invention, first gas filter 43 is positioned between third wall 30 and the part of first chamber 21 containing igniter 40 and first pyrotechnic charge 23.

According to one embodiment of the invention, between igniter 40 and third cap 32 is at least one fourth rigid separation wall 430 having first gas-passage openings 431. This fourth rigid wall 430 forms a barrier (or attenuates) the pressure wave between igniter 40 and third cap 32, to prevent this pressure wave produced by igniter 40 when it is triggered (the combustion of the third pyrotechnic charge initially contained in case 41 inducing a pressure wave from igniter 40 when it is triggered) from breaking third cap 32. It is the pressure increase generated by the combustion gases of first charge 23 in first chamber 21 that induces the opening of third cap 32. Wall 430 forms a barrier element and/or attenuation element of the pressure wave produced by igniter 40.

According to one embodiment of the invention, between first pyrotechnic charge 23 and third cap 32 is at least one fourth rigid separation wall 430 comprising first gas-passage openings 431.

According to one embodiment of the invention, between first closing device 17 and first pyrotechnic charge 23 is a first gas filter 43 surrounding first gas passage 432, which first passage 432 extends between third cap 32 and at least one fourth rigid separation wall 430 having first gas passage openings 431 located facing said first passage 432, the first pyrotechnic charge 23 being found outside first passage 432. Fourth rigid wall 430 is, for example, attached to first filter 43 around first passage 432.

According to one embodiment, the invention dispenses with the ignition relay for second pyrotechnic charge 24, so that the combustion gas of first pyrotechnic charge 23 directly ignites second pyrotechnic charge 24.

According to one embodiment of the invention, wall 430 is formed by a grid or perforated plate.

According to one embodiment of the invention, an element 433 for maintaining first pyrotechnic charge 23 is provided between this first pyrotechnic charge and wall 430, this maintaining element 433 being permeable to gas or combustible to gas and being, for example, foam.

In the embodiment of FIGS. 1, 3 and 4, first passage 432 is delimited along direction L by third cap 32 and wall 430 having openings 431 emerging in first passage 432 and transversely to this direction L by gas filter 43.

In the embodiment of FIG. 2, first passage 432 is delimited along direction L by third cap 32 and wall 430 having openings 431 emerging in first passage 432 and transversely to this direction L also by a part 434 of wall 430 not having openings 431 and positioned against wall 30, the gas filter 43 surrounding a peripheral part 435 of wall 430 connected to part 434. Peripheral part 435 of wall 430 holds wall 430 in position in filter 43.

According to one embodiment of the invention, an element 121 for maintaining second pyrotechnic charge 24 is provided between this second pyrotechnic charge 24 and end 12 of second chamber 22 far from wall 30, this maintaining element 121 being foam, for example.

According to one embodiment of the invention, first filter 43 is, for example, a compacted knit, a metal cloth, a roll of perforated sheet or expanded metal.

According to one embodiment of the invention, between second closing device 18 and second pyrotechnic charge 24 is a second gas filter 44.

According to one embodiment of the invention, second gas filter 44 surrounds a second gas passage 442, which extends at least to face through-hole 31, through-hole 31 being connected, when third cap is broken 32, to the inside of a gas guiding device 33, which is located in second passage 442 and which extends into second chamber 22 up to a point 332 located in second chamber 22 at a distance from second filter 44, the gas guiding device 33 comprising second gas passage openings 331 between its inside and its outside. Second pyrotechnic charge 24 is outside the gas guiding device 33 and outside the second passage.

According to one embodiment of the invention, the second filter 44 is, for example, a compacted knit, a metal cloth, a roll of perforated sheet or expanded metal.

According to one embodiment of the invention, the gas guiding device 33 extends into second chamber 22 up to an end located at a distance from end 12 of chamber 22 and at a distance from second gas filter 44.

The gas guiding device 33 permits homogeneously diffusing the gas jet and hot particles coming from the combustion of first pyrotechnic charge 23 from first chamber 21 into second chamber 22 and thus controlling the ignition of second pyrotechnic charge 24 without it being damaged by the jet of gas and hot particles. Notably, the gas guiding device 33 is formed by a grid with regular openings 331 around direction L.

According to one embodiment of the invention, the second openings 331 located in second passage 442 have a gas passage cross section smaller than that of the second openings 331 located outside second passage 442. Thus more combustion gas from first charge 23 is sent to second charge 24 and to end 12, in order to prevent the gas from first chamber 21 from becoming too cool.

According to one embodiment of the invention, there are no second openings 331 in second passage 442.

According to one embodiment of the invention, second openings 331 are, outside second passage 442, of different cross section, for example, decreasing, along direction L going from wall 30 to wall 12.

According to one embodiment of the invention, the gas guiding device 33 is tubular and forms a diffusion tube. The diffusion tube 33 of second chamber 22 is inserted into second filter 44 to prevent the gas coming from first chamber 21 from being cooled too much by second filer 44.

According to one embodiment of the invention, the first and/or second gas passage 432, 442 extends along a longitudinal direction L going from first chamber 21 to second chamber 22.

According to one embodiment of the invention, igniter 40, first gas passage openings 431 of rigid separation wall 430, first and/or second gas passage 432, 442, third cap 32, through-hole 31 and gas guiding device 33 extend along a longitudinal direction L going from first chamber 21 to second chamber 22, by being, for example, aligned along this direction L.

In the embodiment of FIG. 2, gas guiding device 33 is omitted in second chamber 22 because this second chamber 22 has a length along direction L less than its dimension transverse to this direction L and that the flow of hot combustion gases of first charge 23 of first chamber 21 going through hole 31 in the second permanent state manages to ignite second charge 24. Another element 222 for maintaining the second pyrotechnic charge 24 is provided between this second pyrotechnic charge 24 and wall 220, this maintaining element 222 being permeable to gas or combustible to gas and being, for example, foam, the wall 220 having a through-hole 221 located facing hole 31 to allow gas passage and having a peripheral part 425 for maintaining in filter 44.

According to one embodiment of the invention, represented in FIG. 3, igniter 40 is configured to generate axial ignition along direction L, i.e., toward third cap 32, the gas and hot particles generated by igniter 40 being diffused by it along direction L such as shown by the bold arrow.

According to one embodiment of the invention, shown in FIG. 4, igniter 40 is configured to generate radial ignition transversely to direction L, going toward third cap 32, the gas and hot particles generated by igniter 40 being diffused by it around direction L and the axis of igniter 40 such as shown by the bold arrows. Such as shown in FIG. 2, radial ignition of igniter 40 is more favorable.

According to one embodiment of the invention, the first closing device 17 is formed by a first cap 17 sealing the first gas outlet opening 15 and able to be broken under said combustion gas pressure from first pyrotechnic charge 23, the second closing device 18 is formed by a second cap 18 sealing the second gas outlet opening 16 and able to be broken under said combustion gas pressure from said second pyrotechnic charge 24, the first cap 17 and the third cap 32 and/or the second cap 18 and the third cap 32 being made in one piece.

According to one embodiment of the invention, through-hole 31 is stepped and has several successive different gas passage sections, and, for example in the embodiment shown in FIGS. 1, 3 and 4, a first section 311 of greater passage area than that of a second section 312 connected to it, first section 311 being located on the side of first chamber 21 and defining the pressure from which third cap 32 located on this side is broken, while second section 312 is located on the side of the second chamber and allows controlling the flow of gas in through-hole 31. This is notably advantageous in the case where first cap 17 and third cap 32 and/or second cap 18 and third cap 32 form only a single piece.

Generally, the opening of a dashboard cover by an airbag inflated by a gas generator takes 5 to 8 milliseconds, regardless of the operating temperature. To limit the damage to the dashboard by the gas generator, the second chamber 22 should not generate gas in the module before the dashboard opens. Thus, there is a sufficient delay between igniting second chamber 22 (corresponding to an inflection point for the curve of FIG. 5, located between 10 and 15 milliseconds at +22° C.) and ignition of the first chamber. Thus, the delay in igniting second chamber 22 after igniting igniter 40 of first chamber 21 is:

greater than or equal to 15 milliseconds, and, for example between 15 and 20 ms at −30° C., greater than or equal to 10 milliseconds and, for example, between 10 and 15 milliseconds at ambient temperature (e.g. +22° C.), greater than or equal to 5 milliseconds and, for example, between 5 and 10 ms at +85° C.

According to one embodiment of the invention, first filter 43 and/or second filter 44 is at a distance with regard to respective openings 15, 16 to prevent overpressure in respective combustion chamber 21, 22 and an aspiration of filter 43 and/or 44 in respective diffusion openings 15, 16.

The invention claimed is:
1. A gas generator comprising:
first and second pyrotechnic charges located respectively in first and second chambers, the first chamber partly delimited by a first outer wall having a first opening for releasing gas outside of the gas generator, the second chamber partly delimited by a second outer wall having a second opening for releasing gas outside of the gas generator, the first chamber provided with an igniter suitable to be triggered to ignite the first pyrotechnic charge, the second chamber having no igniter, the first chamber abutting the second chamber and being separated from the second chamber by a third wall that partially delimits the first and second chambers,
the first opening closed by a first closing device that is suitable to be opened under pressure of combustion gases of the first pyrotechnic charge,
the second opening closed by a second closing device that is suitable to be opened under pressure of combustion gases of the second pyrotechnic charge,
a third wall including a through hole extending between the first chamber and the second chamber, the through hole being sealed in a first initial state by at least one third cap, the through hole operative to ensure permanent communication of gas directly between the first chamber and the second chamber in a second permanent state, the third cap being configured to be broken under the pressure of the combustion gases of the first pyrotechnic charge such that, when the third cap is in a broken state corresponding to the second permanent state, to permanently keep open the through hole of the third wall in said second permanent state and to let the combustion gases of the first pyrotechnic charge through said through hole permanently open in said second permanent state from the first chamber to the second chamber, where the combustion gases of the first pyrotechnic charge induce the combustion of the second pyrotechnic charge,
wherein the third cap seals the through hole when the third cap is in the first initial state, and the third cap is configured to go to the second permanent state under pressure of the combustion gases of the second pyrotechnic charge, and wherein the third cap is broken in the second permanent state to permanently keep the through hole of the third wall open in said second permanent state and to let the combustion gases of the second pyrotechnic charge through said through hole in said second permanent state from the second chamber to the first chamber, such that the combustion gases of the second pyrotechnic charge induce the combustion of the first pyrotechnic charge.

2. The gas generator according to claim 1, further comprising a fourth rigid separation wall having first gas-passage openings, the fourth rigid separation wall disposed between the igniter and the third cap.

3. The gas generator according to claim 1, further comprising a gas filter between the first closing device and the first pyrotechnic charge.

4. The gas generator according to claim 3, wherein the gas generator has means arranged to allow opening of the first closing device before the second closing device by triggering the igniter.

5. The gas generator according to claim 1, further comprising a fourth rigid separation wall having first gas-passage openings between the first pyrotechnic charge and the third cap.

6. The gas generator according to claim 1, further comprising a gas filter disposed between the second closing device and the second pyrotechnic charge.

7. The gas generator according to claim 6, wherein the gas filter surrounds a gas passage, which extends at least to face the through hole, the through hole being connected, when the third cap is broken, to an inside of a gas guiding device, which is located in the gas passage and which extends into the second chamber up to a point located in the second chamber at a distance from the gas filter, the gas guiding device comprising second gas passage openings between an inside of the gas guiding device and an outside of the gas guiding device, the second pyrotechnic charge being outside the gas passage.

8. The gas generator according to claim 7, wherein the gas guiding device is tubular.

9. The gas generator according to claim 1, wherein the first pyrotechnic charge has a first mass, the second pyrotechnic charge has a second mass and distribution of mass between the first and second pyrotechnic charges is greater than or equal to ¼ and less than or equal to 3.

10. The gas generator according to claim 1, wherein the first pyrotechnic charge has a first mass, the second pyrotechnic charge has a second mass and distribution of mass between the first and second pyrotechnic charges is less than or equal to 1.

11. The gas generator according to claim 1, wherein the generator has means arranged to allow ignition of the first pyrotechnic charge before the second pyrotechnic charge by triggering the igniter.

12. The gas generator according to claim 1, further comprising means arranged to allow opening of the third cap before the first closing device by triggering the igniter.

13. The gas generator according to claim 1, further comprising means arranged to allow opening of the third cap before the second closing device by triggering the igniter.

14. A gas generator comprising:
first and second pyrotechnic charges located respectively in first and second chambers, the first chamber partly delimited by a first outer wall having a first opening or releasing as outside of the gas generator, the second cha be partly delimited by a second outer wall having a second opening for releasing gas outside of the gas generator, the first chamber provided with an igniter suitable to be triggered to ignite the first pyrotechnic charge, the second chamber having no igniter, the first chamber abutting the second chamber and being separated from the second chamber by a third wall that partially delimits the first and second chambers,
the first opening closed by a first closing device that is suitable to be opened under pressure of combustion gases of the first pyrotechnic charge,
the second opening closed by a second closing device that is suitable to be opened under pressure of combustion gases of the second pyrotechnic charge,
a third wall including a through hole extending between the fist chamber and the second chamber, the through hole being sealed in a first initial state by at least one third cap, the through hole operative to ensure permanent communication of gas directly between the first chamber and the second chamber in a second permanent state, the third cap being configured to be broken under the pressure of the combustion gases of the first pyrotechnic charge such that, when the third cap in a broken state corresponding to the second permanent state, to permanently keep open the through hole of the third wall in said second permanent state and to let the combustion gases of the first pyrotechnic charge through said through hole permanently open in said second permanent state from he first chamber to the second chamber where the combustion gases of the first pyrotechnic charge induce the combustion of the second pyrotechnic charge,
wherein the third cap, seals the through hole when the third cap is in the first initial state, and the third cap configured to so to the second permanent state under pressure of the combustion gases of the second pyrotechnic charge, and wherein the third cap is broken in the second permanent state to permanently keep the through hole of the third wall open in said second permanent state and to let the combustion gases of the second pyrotechnic charge through said through hole in said second permanent state from the second chamber to the first chamber, such that the combustion gases of the second pyrotechnic charge induce the combustion of the firsts pyrotechnic charge,
wherein between the first closing device and the first pyrotechnic charge is a first gas filter surrounding a first gas passage, which extends between the third cap and at least one fourth rigid separation wall comprising first gas passage openings located facing said first passage, the first pyrotechnic charge being outside the first passage.

15. The gas generator according to claim 14, wherein the gas passage extends along a longitudinal direction going from the first chamber to the second chamber.

16. A gas generator comprising:
first and second pyrotechnic charges located respectively in first and second chambers, the first chamber partly delimited by a first outer wall having a first opening for releasing gas outside of the gas generator, the second chamber partly delimited by a second outer wall having a second opening for releasing gas outside of the gas generator, the first chamber provided with an igniter suitable to be triggered to ignite the first pyrotechnic charge the second chamber having igniter, the first chamber abutting the second chamber and being separated from the second chamber by a third wall that partially delimits the first and second chambers,
the first opening closed by a first closing device that is suitable to be opened under pressure of combustion gases of the first pyrotechnic charge,
the second opening closed by a second closing device that is suitable to be opened under pressure of combustion gases of the second pyrotechnic charge,
a third wall including a through hole extending between the first chamber and the second chamber, the through hole being sealed in a first initial state by at least one third cap, the through hole operative to ensure permanent communication of gas directly between the first chamber and the second chamber in a second permanent state, the third cap being configured to be broken under the pressure of the combustion gases of the first pyrotechnic charge such that, when the third cap is in a broken state corresponding to the second permanent state, to permanently keep open the through hole of the third wall in said second permanent state and to let the combustion gases of the first pyrotechnic charge through said through hole permanently open in said second permanent state from the first chamber to the second chamber, where the combustion gases of the first pyrotechnic charge induce the combustion of the second pyrotechnic charge, wherein the third cap seals the through hole when the third cap is in the first initial state, and the third cap is configured to go to the second permanent state under pressure of the combustion gases of the second pyrotechnic charge, and wherein the third cap is broken in the second permanent state to permanently keep the through hole of the third wall open in said second permanent state and to let the combustion gases of the second pyrotechnic charge through said through hole in said second permanent state from the second chamber to the first chamber, such that the combustion gases of the second pyrotechnic charge induce the combustion of the firs pyrotechnic charge, and means arranged to allow opening of the first closing device before the third cap by triggering the igniter.

17. A gas generator comprising:

first and second pyrotechnic charges located respectively in first and second chambers, the first chamber partly delimited by a first outer wall having a first a opening for releasing gas outside of the gas generator, the second chamber partly delimited by a second outer wall having a second opening for releasing gas outside of the gas generator, the first chamber provided with an igniter suitable to be triggered to ignite the first pyrotechnic charge, the second chamber having no igniter, the first chamber abutting the second chamber and being separated from the second chamber by a third wall that partially delimits the first and second chambers, the first opening closed by a first closing device that is suitable to be opened under pressure of combustion gases of the first pyrotechnic charge, the second opening closed by a second closing device that is suitable to be opened under pressure of combustion gases of the second pyrotechnic charge, a third wall including a through hole extending between the first chamber and the second chamber, the through hole being sealed in a first initial state by at least one third cap, the through hole operative to ensure permanent communication of gas directly between the first chamber and the second chamber in a second permanent state, the third cap being configured to be broken under the pressure of the combustion gases of the first pyrotechnic charge such that, when the third cap is in a broken state corresponding to the second permanent state, to permanently keep open the through hole of the third wall in said second permanent state and to let the combustion gases of the first s pyrotechnic charge through said through hole permanently open in said second permanent state from the first chamber to the second chamber, where the combustion gases of the first pyrotechnic charge induce the combustion of the second pyrotechnic charge, wherein the third cap seals the through hole when the third cap is in the first initial state, and the third cap is configured to go to the second permanent state under pressure of the combustion gases of the second pyrotechnic charge, and wherein the third cap broken in the second permanent state to permanently keep the through hole of the third wall open in said second permanent state and to let the combustion gases of the second pyrotechnic charge through said through hole in said second permanent state from the second chamber to the first chamber, such that the combustion gases of the second pyrotechnic charge induce the combustion of the first pyrotechnic charge, wherein the first closing device is formed by a first cap sealing first opening for gas outlet to the outside and suitable to be broken under pressure of the combustion gases of the first pyrotechnic charge, the second closing device is formed by a second cap sealing the second opening for gas outlet to the outside and suitable to be broken under the combustion gases pressure of the second pyrotechnic charge, the third cap and at least one of the first and second caps made of a single piece.

* * * * *